March 22, 1966  G. W. STANTON ETAL  3,242,232
COMPOSITIONS COMPRISING GRAFT COPOLYMERS OF CERTAIN MONOMERS
OF POLYGLYCOL ETHERS OF ALKENYL AROMATICS ON
POLYOLEFIN SUBSTRATES AND THE METHOD
OF MAKING SAID COMPOSITIONS
Filed June 22, 1962

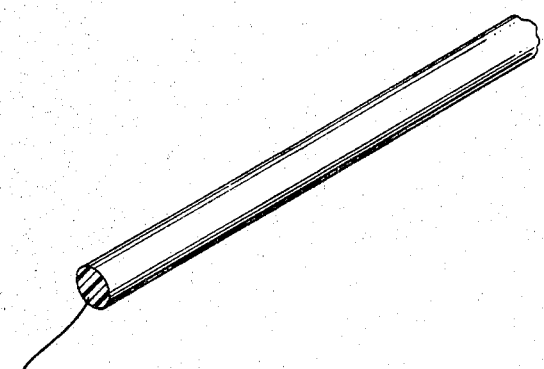

Filamentous article comprising a graft copolymer of certain polyglycol ether monomers on a polyolefin polymer substrate.

INVENTORS.
George W. Stanton
BY Teddy G. Traylor

Griswold & Burdick
ATTORNEYS

United States Patent Office 3,242,232
Patented Mar. 22, 1966

3,242,232
COMPOSITIONS COMPRISING GRAFT COPOLY-
MERS OF CERTAIN MONOMERS OF POLYGLY-
COL ETHERS OF ALKENYL AROMATICS ON
POLYOLEFIN SUBSTRATES AND THE METHOD
OF MAKING SAID COMPOSITIONS
George W. Stanton, Walnut Creek, and Teddy G. Traylor,
Del Mar, Calif., assignors to The Dow Chemical Com-
pany, Midland, Mich., a corporation of Delaware
Filed June 22, 1962, Ser. No. 205,827
9 Claims. (Cl. 260—878)

This application is a continuation-in-part of copending application for United States Letters Patent having Serial No. 711,944, filed January 29, 1958, and now abandoned.

The present invention lies generally in the field of organic chemistry and contributes in particular to the art which pertains to synthetic, fiber-forming high polymers. More particularly, the present invention has reference to the provision of hydrophilic graft or block-type copolymers exhibiting improved dyeability and reduced static charge that are comprised of certain polyglycol ether monomers, as hereinafter more fully delineated, polymerized on non-aromatic, hydrocarbon, polyolefin polymer substrates which may hereinafter be more simply referred to as "polyolefin polymers" or merely as "polyolefins."

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Non-aromatic, hydrocarbon, polyolefin polymers may be utilized with great advantage for such purposes.

The polyolefin materials that are contemplated as being adapted for utilization as substrates in the practice of the present invention include any of the non-aromatic hydrocarbon olefin polymers, such as polyethylene, polypropylene and the like, that have been prepared from monomeric, non-aromatic hydrocarbon monoolefinic monomers containing from 2 to 8 carbon atoms in their molecule, such as ethylene, propylene, 4-methylpentene and the like. It is especially advantageous to utilize a polypropylene composition, particularly one of the fiber-forming variety, for this purpose. In this connection, it is generally desirable for the polyolefin that is employed to be one of the relatively more recent macromolecular, essentially linear high density species of polymers that have become available and which are generally characterized by their essentially linear unbranched stereospecific molecular configurations, and which may be made under the influence of such catalyst systems as have been described in Belgian Patent No. 533,362 (which are frequently known as being Ziegler-type catalysts). If desired, however, polyethylene may be utilized which is of the conventional, generally branch structured variety that has ordinarily been polymerized under high pressures and is oftentimes referred to and known as being a "polythene."

Difficulty is often encountered in dyeing or coloring synthetic hydrophobic fibers and the like that have been prepared from non-aromatic, hydrocarbon olefin polymers. This is especially so when it is attempted to obtain relatively deeper shades of coloration in the finally dyed product.

Various techniques have been evolved for providing polyolefin compositions of improved dyeability. The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified polyolefin polymers. Also, such products, once they have been prepared, may not be as receptive as might be desired to a wide range of dyestuffs, due to inherent limitations in the materials capable of being employed for enhancing dye-receptivity.

It would be advantageous, and it is the chief aim and concern of the present invention, to provide non-aromatic, hydrocarbon polyolefins which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified polyolefin polymer substrates, and of the general order obtainable with polypropylene, for example. This would possibilitate the manufacture of non-aromatic hydrocarbon polyolefin based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which consists of a non-aromatic, hydrocarbon polyolefin substrate having a minor proportion of substituents graft copolymerized thereto which comprise or consist essentially of polymerized polyglycol ether monomers of the varieties, hereinafter particularized. Schematically, the compositions may be structurally represented in the following manner:

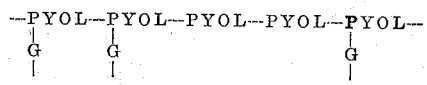

wherein the interlinked "PYOL" symbols represent the polyolefin polymer substrate or trunk and the symbols "G" connected thereto the substituent graft copolymer branches of the indicated polyglycol ether monomer provided thereon.

As is apparent, the graft copolymer substituent that is combined with the polyolefin polymer substrate lends the desired receptivity of and substantivity for various dyestuffs to the compositions while the nonaromatic, hydrocarbon, polyolefin polymer trunk substrate that is so modified facilitates and secures the excellent physical properties and characteristics of the various shaped articles, including fibers into which the compositions may be fabricated. Advantageously, as mentioned, the polyolefin polymer substrate that is modified by graft copolymerization to provide the compositions of the invention is polypropylene, particularly that of the fiber-forming variety.

It is usually beneficial, as has been indicated, for the graft copolymer compositions of the present invention to contain a major proportion of the polyolefin polymer trunk or substrate that has been modified with the substituent dye-receptive graft copolymer groups chemically attached thereto. As a general rule, for example, it is desirable for the graft copolymer to be comprised of at least about 80 percent by weight of the polyolefin polymer substrate. In many instances, it may be satisfactory for the graft copolymer composition to be comprised of between about 85 and 95 percent by weight of the polyolefin polymer substrate, particularly when it is polypropylene. In this connection, however, better dyeability may generally be achieved when the grafted polyglycol ether copolymeric substituents are prepared under such conditions that they have relatively long chain lengths. Thus, it is usually preferable, when identical quantities of grafted substituents are involved, for relatively fewer, but longer chain length grafts to be available than to have a greater number of substituents of relatively shorter chain length.

The monomeric polyglycol ethers of alkenyl aromatics which are utilized as monomers to modify the polyolefin polymer substrates so as to provide the graft copolymer compositions of the present invention may be any of those (or their mixtures) of the structural formula:

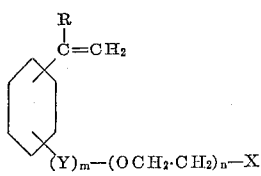

(I)

wherein R is selected from the group consisting of hydrogen and methyl radicals; $n$ has an average numerical value between about 1 and 40, advantageously between about 10 and 20; Y is a bivalent hydrocarbon radical containing 1 to 4 carbon atoms; $m$ has a numerical value of 0 or 1 and X is selected from the group consisting of halogen, hydroxyl and alkoxys containing 1–4 carbons. These monomeric polyglycol ethers of alkenyl aromatics are discussed in U.S. 3,029,219 (issued April 10, 1962).

Other substituents may occur on the benzene ring of the indicated structural formula such as halogens or lower alkyl groups without significantly changing the functionality of the monomer in regard to the present invention.

The monomeric alkenyl aromatic polyglycol ether that is employed may have a molecular weight between 164 and about 2000, advantageously from about 500 to 1500. Typical of the various monomers that may be employed in the practice of the present invention are those included in the following tabulation, wherein the species that are deemed to be of special advantage for use are designated by the symbol (F); the value of the variables in the generic structural formula are also indicated:

10, 1959, now abandoned. Two general methods are especially useful in obtaining a wide variety of required monomeric materials:

(1) 4-vinyl benzyl alcohol or its homologues such as isopropenyl benzyl alcohol, vinyl phenyl ethyl alcohol, vinyl phenol (hydroxystyrene), isopropenyl phenol, etc. can be readily reacted with ethylene oxide to produce the corresponding polyglycol ether. The chain length of the polyethylene glycol ether moiety is controlled as desired by the concentration of ethylene oxide and the temperature of reaction.

(2) Vinyl benzyl chloride or its homologues react with suitably selected polyglycols or polyglycol derivatives (such as monomethyl ethers) to provide a variety of monomers of the above indicated scope. The essence of the conditions for these reactions is widely described in the literature as for example, at page 1167 of "Organic Chlorine Compounds" by E. H. Huntress (Wiley & Sons, 1948).

Modifications of the above procedures obvious to those skilled in the art may be employed to obtain specific species of the indicated generic scope. For example, sodium vinyl phenate may be reacted with chlorohydrines of polyglycols or their tosylates (J. Am. Chem. Soc., 59, 228 (1937)) to obtain the corresponding ethers. Another technique which has proved useful at times is the preparation of 2-bromoethyl benzyl ethers of polyglycols and their derivatives followed by dehydrobromination to produce the desired vinyl compound.

As mentioned, the graft copolymer compositions of the invention have remarkably good dye-receptivity, particularly in view of their polyolefin polymer origin. In most cases, for example, the dye-receptivity of the graft copolymer compositions of the present invention is improved to such an extent in comparison with unmodified polyolefin polymers, particularly unmodified polypropylene, that a color differential of at least about 30 Judd units, as hereinafter illustrated, may readily be obtained between samples of the unmodified polyolefin polymer substrate and the graft copolymer compositions of the present invention, each of which have been dyed at a 4 percent dyeing according to conventional techniques with such a dyestuff as Amacel Scarlet BS (American Prototype No. 244 or Colour Index Disperse Red 1 or 11110).

TABLE I

| Typical Aromatic Polyglycol Ethers | R | Y | m | n | X |
|---|---|---|---|---|---|
| 1-(4-vinyl benzyloxy) 2-methoxyethoxy ethane | H | $-CH_2-$ | 1 | 2 | $CH_3O-$ |
| (F) 2-(4-vinyl benzyloxy)-(ethoxy)$_{18}$ ethyl alcohol | H | $-CH_2-$ | 1 | 19 | $-OH$ |
| 2-(4-vinyl benzyloxy)-(ethoxy)$_{19}$ ethyl chloride | H | $-CH_2-$ | 1 | 19 | Cl |
| (F) 2-(4-vinyl phenoxy)-(ethoxy)$_{10}$ ethyl, methyl ether | H |  | 0 | 11 | $CH_3O-$ |
| 2-(4-isopropenyl benzyloxy)-(ethoxy)$_{10}$ ethyl alcohol | $CH_3-$ | $-CH_2-$ | 1 | 11 | $-OH$ |
| 2-(2-vinyl benzyloxy)-(ethoxy)$_4$ ethyl, ethyl ether | H | $-CH_2-$ | 1 | 5 | $C_2H_5O-$ |
| 2-(4-vinyl phenoxy)-(ethoxy)$_{16}$ ethyl alcohol | H |  | 0 | 17 | $-OH$ |
| 2-(4-isopropenyl phenyl) 2-(2-hydroxy)-(ethoxy)$_{16}$ propane | $CH_3-$ | $CH_3-\underset{\,}{C}-CH_3$ | 1 | 16 | $-OH$ |
| (F) 2-(4-vinyl benzyloxy)-(ethoxy)$_{10}$ ethyl alcohol | H | $-CH_2-$ | 1 | 11 | $-OH$ |

The hydrophilic nature of the polyethylene glycol chain contributes the desirable and sought-after characteristics of dye receptivity and reduced static charge generation to the resulting graft copolymers on polyolefin substrates. The length of the polyglycol chain selected and the quantity of monomer grafted to the substrate provide the necessary control for the production of a wide range and combination of properties desired in the finished fabricated product such as textile fibers or films.

Standard procedures customarily employed in the synthesis of organic compounds are followed to obtain the various desired configurations of the present alkenyl benzyl polyglycol ethers. These alkenyl benzyl polyglycol ethers and their preparation are discussed in the co-pending application of Stephen C. Stowe for United States Letters Patent having Serial No. 205,090, filed June 25, 1962, entitled "Monomeric Alkenyl Benzyl Polyglycol Ethers," which application is a continuation-in-part of application Serial No. 832,443, filed August This is a significant advantage when the compositions are fabricated into shaped article form, especially when they are prepared in a filamentary form suitable for use as a textile material.

The Judd unit referred to in the foregoing is described and defined by D. B. Judd in an article in the "American Journal of Psychology," vol 53, page 418 (1939). More applicable data appears in "Summary on Available Information on Small Color Difference Formulas" by Dorothy Nickerson in the American Dyestuff Reporter, vol. 33, page 252 (June 5, 1944). See also "Interrelation of Color Specifications" by Nickerson in the "Paper Trade Journal," vol. 125, page 153 for November 6, 1947.

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using acid, vat, acetate, and naphthol dyes. Such dyestuffs, in addition to the particular variety mentioned, by way of didactic illustration, as Calcocid Alizarine Violet (Colour Index 61710, formerly Colour Index 1080), Sulfanthrene Red 3B (Colour Index Vat Violet 2), Naphthol ASMX (Colour Index 35527), Fast Red TRN Salt (Colour Index Azoic Diazo 11), and Immedial Bordeaux G (Colour Index Sulfur Brown 12) may advantageously be employed for such purposes.

Other dyestuffs, by way of further illustration, that may be utilized beneficially on fiber products of the dye-receptive graft copolymer compositions of the invention includes such basic dyes as Brilliant Green Crystals (Colour Index Basic Green 1) and Rhodamine B Extra S (Colour Index Vat Blue 35); such vat dyestuffs as Sulfanthrene Blue 2B Dbl. Paste (Colour Index Vat Blue 5), and Sulfanthrene Red 3B Paste (Colour Index Vat Violet 2); Indigosol Green IB Powder (Colour Index Vat Green 1), a soluble vat dyestuff; such acetate dyes as Celliton Fast Brown 3RA Extra CF (Colour Index Dispersed Orange 5), Celliton Fast Rubine BA CF (Colour Index Dispersed Red 13), Artisil Direct Red 3BP Conc. (Colour Index Dispersed Red 15), Celanthrene Pure Blue BRS 400 percent (Colour Index Dispersed Blue 1), and Acetamine Yellow N (Colour Index Dispersed Yellow 32); and the like.

The dyed products, especially textile fiber products, are generally lightfast and are well imbued with good resistance to crocking. A shaped filamentary article prepared from a dye-receptive composition in accordance with the present invention is schematically illustrated in the sole figure of the hereto annexed drawing.

The dye-receptive graft copolymers of the present invention may be prepared and provided by swelling or impregnating the polyolefin polymer substrate with the monomeric substance then polymerizing the monomer in situ in the substrate. Advantageously, this may be accomplished when the substrate is in the form of an already shaped article, such as a fiber or filamentary structure. Beneficially, the graft copolymerization of the impregnated monomer may be accomplished and facilitated with the assistance of a polymerization catalyst or catalyzing influence, which preferentially interacts with the substrate in order to establish or form grafting sites thereon and simultaneously or subsequently initiate the graft copolymerization. As a practical matter, it is generally most desirable to form the graft copolymer compositions in such manner. Most of the free radical generating chemical catalysts, including peroxide and persulfate catalysts, and actinic radiations, including ultraviolet light, may be utilized for the desired graft copolymerization. It may often be exceptionally advantageous, however, to accomplish the graft copolymerization by subjecting the monomer-impregnated polyolefin polymer substrate to a field of high energy radiation in order to efficiently provide an effectively attached graft copolymer of the polymerized monomeric impregnant on the hydrophobic polyolefin polymer substrate. Excellent results may also be achieved by activating the polyolefinic polymer substrate prior to contact with the monomer so as to generate or create free radical sites upon the substrate to which the monomer may attach in order to form the graft polymerized substituents. Such activation, as is known, may be accomplished by means of pre-irradiation in fields of high energy radiation (including ultraviolet light) or by exposing the polyolefinic polymer substrate to the influence of oxygen (in the presence of ultraviolet light) or to already formed ozone prior to contact with the graft copolymer-forming monomer.

The monomer may be intimately impregnated in the polyolefin polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the polyolefin polymer substrate with the latter being immersed in the bath for a sufficient period of time to attain a desired monomer content adequate for the intended purpose. The polyolefin polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the polyolefin polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose. Graft copolymerization on preactivated substrates may ordinarily be accomplished by simply exposing the activated substrate to the monomer (preferably in concentrated solution) at an elevated temperature until the graft copolymerized substituents have formed on the substrate.

When the graft copolymer compositions are prepared from preformed or already shaped polyolefin polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the acrylonitrile polymer substrate being modified in order to provide the compositions of the present invention. In addition, as has been indicated, particularly when pre-activation of the substrate is performed, ultraviolet light may also be employed as the high energy radiation form including its use in combination with oxygen or ozone.

For purposes of specifically illustrating, without intending to thereby limit the invention, the following didactic examples are provided wherein, unless otherwise indicated, all parts and percentages are to be taken by weight.

Example 1

A fine fiber sample of 4 denier melt spun polypropylene was ozonated by being exposed for one hour at room temperature to a stream of oxygen that contained from 2 to 6 percent ozone. The ozone in the oxygen stream was generated by passing oxygen through a 7,500 volt electric arc. The polypropylene in the fiber had an apparent molecular weight of about 200,000 (as determined by viscosity) and a melting point crystalline of about 160° C. After having been ozonated so as to cause activation of the polymer by generation of free radical sites, the fiber sample was immersed in a 10 percent suspension of monomeric 1-(2-methoxyethoxy) - 2 - vinyl-benzyloxy-ethane. The fiber was maintained in the monomeric dispersion for a period of about 4 hours at a temperature of 100° C. It was then removed from the monomer suspension, rinsed thoroughly with water, dried and subsequently dyed in the conventional manner with 4 percent Amacel Scarlet BS. Excellent results were achieved with the graft copolymerized fiber product having deep and level shades of coloration. In contrast, the unmodified polypropylene yarn was only slightly stained with the same dyestuff. The graft copolymerized fiber product was also dyed well to deep and level shades of coloration with Calcodur Pink 2BL, (C.I. 353) a direct dye, and Sevron Brilliant Red 4G, a basic dye known formerly as Basic Red 4G (Colour Index Basic Red 14). The improvement in dye-receptivity between the graft copolymerized fiber products of the present invention in comparison with unmodified polypropylene was such that a color differential of about 25 Judd units was obtained between the Amacel Scarlet BS-dyed graft copolymer composition and the unmodified polypropylene fiber.

Example 2

The procedure of Example 1 was repeated with the exception that the ozonated fiber was treated in a 10 percent N-methyl pyrrolidone dispersion of a polyglycol type monomer having the structural formula:

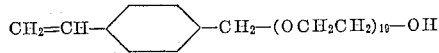

Good dyeability was obtained with Amacel Scarlet BS and other dyestuffs in the graft copolymerized fiber product. A qualitative test for static generation was performed by rubbing the fiber sample on a piece of nylon cloth which revealed the treated sample to generate a much lower static charge compared to the untreated blank.

Example 3

The procedure of Example 2 was repeated with the exception that the monomer treating suspension contained about 25 percent of the indicated variety of polyglycol type monomer in combination with about 5 percent of divinyl benzene. Excellent dyeability to deep and level shades of coloration was obtained in the graft copolymerized fiber product with Amacel Scarlet BS and other dyestuffs.

Example 4

The procedure of Example I is duplicated excepting to accomplish the graft copolymerization under the influence of an electron beam from a Van de Graaff generator (instead of the ozone) operated at 2 million electron volts to effect a total dosage of about 10 mrep. at a dose of about 5 mrep. per minute. Similar results are obtained.

Results similar to the foregoing may also be obtained when any other of the mentioned varieties of polyglycol ester monomers of the Formula I are utilized in a similar manner in place of those set forth in the above examples and when graft copolymers are prepared with such monomers on unfabricated forms of the polymer substrate or when the monomers are utilized with other varieties of non-aromatic, hydrocarbon olefin polymers.

What is claimed is:

1. Dye-receptive graft copolymer composition comprised of (1) a polyolefin of a 2 to 8 carbon atom, non-aromatic monoolefin, said polyolefin having chemically attached to carbon atoms in its chain, as graft copolymerized substituents thereon, a minor proportion of up to about 20 percent by weight, based on the weight of the composition, of units of (2) a polymerized monomer of the structural formula:

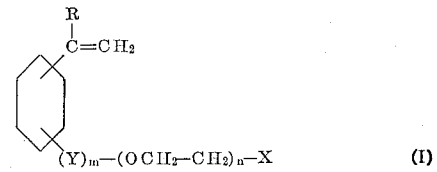

wherein R is selected from the group consisting of hydrogen and methyl radicals; $n$ has an average numerical value between 1 and 40; Y is a bivalent hydrocarbon radical containing 1 to 4 carbon atoms; $m$ has a numerical value, in whole units of 0 to 1; and X is selected from the group consisting of halogen, hydrogen and alkoxy radicals containing 1 to 4 carbon atoms.

2. The composition of claim 1, wherein said polyolefin has between about 5 and 15 percent by weight, based on the weight of the composition, of said graft copolymerized substituents attached thereto.

3. The composition of claim 1, wherein said polyolefin is polypropylene.

4. The composition of claim 1, wherein said graft copolymerized substituents are comprised of polymerized 1-(2-methoxyethoxy)-2-vinyl-benzyloxy ethane.

5. The composition of claim 1, wherein said graft copolymerized substituents are comprised of a polymerized monomer of the structure:

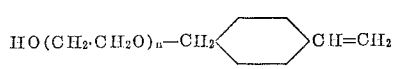

wherein $n$ is in the range of 10 to 30.

6. The composition of claim 1, wherein said polyolefin is polypropylene and wherein said graft copolymerized substituents are present in an amount up to about 20 percent by weight, based on the weight of the composition, and are comprised of a polymerized monomer of the structure:

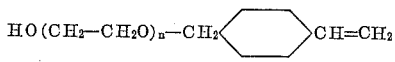

wherein *n* is in the range of 10 to 30.

7. A filamentary shaped article comprised of the composition set forth in claim 6.

8. A filamentary shaped article comprised of the composition set forth in claim 1.

9. Method for the preparation of a dye-receptive graft copolymer which consists essentially of contacting a polymer of a 2 to 8 carbon atom, non-aromatic monoolefin with a monomer of the structural formula:

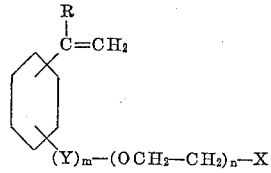

wherein R is selected from the group consising of hydrogen and methyl radicals; *n* has an average numerical value between 1 and 40; Y is a bivalent hydrocarbon radical containing 1 to 4 carbon atoms; *m* has a numerical value, in whole units of 0 to 1; and X is selected from the group consisting of halogen, hydrogen and alkoxy radicals containing 1 to 4 carbon atoms; then polymerizing said monomer until said monomer is graft copolymerized on said polymer.

References Cited by the Examiner

UNITED STATES PATENTS

| | | | |
|---|---|---|---|
| 2,794,799 | 6/1957 | Coover | 260—878 |
| 3,029,219 | 4/1962 | Murdock | 260—886 |

FOREIGN PATENTS 764,299  12/1956  Great Britain.

MURRAY TILLMAN, *Primary Examiner.*

JAMES A. SEIDLECK, N. W. SHUST, W. L. BASCOMB, *Assistant Examiners.*